US009830820B2

(12) United States Patent
Semsey et al.

(10) Patent No.: US 9,830,820 B2
(45) Date of Patent: Nov. 28, 2017

(54) HVAC SYSTEMS FOR A MOTOR VEHICLE

(71) Applicant: Continental Automotive GmbH, Hannover (DE)

(72) Inventors: Akos Semsey, Regensburg (DE); Christoph Baumgaertner, Regenstauf (DE); Martin Bruell, Barbing (DE); Egor Sawazki, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 15/319,060

(22) PCT Filed: Jun. 1, 2015

(86) PCT No.: PCT/EP2015/062113

§ 371 (c)(1),
(2) Date: Dec. 15, 2016

(87) PCT Pub. No.: WO2015/193090

PCT Pub. Date: Dec. 23, 2015

(65) Prior Publication Data

US 2017/0124873 A1 May 4, 2017

(30) Foreign Application Priority Data

Jun. 17, 2014 (DE) ........................ 10 2014 211 550

(51) Int. Cl.
*B60Q 1/48* (2006.01)
*G08G 1/14* (2006.01)
*B60H 1/00* (2006.01)

(52) U.S. Cl.
CPC ............. *G08G 1/14* (2013.01); *B60H 1/0075* (2013.01); *B60H 1/00778* (2013.01); *B60H 1/00985* (2013.01)

(58) Field of Classification Search
CPC .... G08G 1/14; B60H 1/0075; B60H 1/00778; B60H 1/00985
See application file for complete search history.

(56) References Cited

U.S. PATENT DOCUMENTS

2014/0074385 A1* 3/2014 Dudar ................ F02M 25/0818 701/113
2015/0375699 A1* 12/2015 Lamprecht ............ B60R 16/037 701/2

(Continued)

FOREIGN PATENT DOCUMENTS

DE 102009027543 A1 1/2011 ............. G01C 21/34
DE 102010054081 A1 6/2012 ............ B60W 30/06

(Continued)

OTHER PUBLICATIONS

International Search Report and Written Opinion, Application No. PCT/EP2015/062113, 22 pages, dated Aug. 6, 2015.

*Primary Examiner* — Quang D Pham
(74) *Attorney, Agent, or Firm* — Slayden Grubert Beard PLLC

(57) ABSTRACT

The present disclosure relates to motor vehicles in general. The teachings thereof may be embodied in various systems and methods for heating and air conditioning motor vehicles. Some embodiments may include a method for indicating a parking position for a motor vehicle, including determining a starting time period for a future start of use of the motor vehicle; determining a direction of solar radiation for a temperature-control time period preceding the starting time period, the direction of solar radiation determined relative to a current or future course of the roadway along which the motor vehicle moves; determining an outside temperature; determining a parking position for the motor vehicle, at which parking position a passenger compartment of the motor vehicle receives a quantity of solar radiant heat (Continued)

smaller than a quantity of solar radiant heat of an alternative parking position thereto if the outside temperature is above a setpoint temperature; and displaying the parking position.

12 Claims, 2 Drawing Sheets

(56) References Cited

U.S. PATENT DOCUMENTS

| | | | | |
|---|---|---|---|---|
| 2016/0132618 | A1* | 5/2016 | Lovell | G01D 3/00 703/8 |
| 2016/0225201 | A1* | 8/2016 | Hiroki | B60W 50/0097 |
| 2016/0368489 | A1* | 12/2016 | Aich | B60W 30/06 |
| 2017/0046957 | A1* | 2/2017 | Jordens | B60H 1/00778 |

FOREIGN PATENT DOCUMENTS

| | | | | |
|---|---|---|---|---|
| DE | 102012221179 | A1 | 5/2014 | B60R 16/02 |
| JP | 2008275491 | A | 11/2008 | G01C 21/00 |
| JP | 2011122938 | A | 6/2011 | G01C 21/26 |
| KR | 20100013575 | A | 2/2010 | G08G 1/04 |
| WO | 2015/193090 | A1 | 12/2015 | G01C 21/36 |

* cited by examiner

HVAC SYSTEMS FOR A MOTOR VEHICLE

CROSS-REFERENCE TO RELATED APPLICATIONS

This application is a U.S. National Stage Application of International Application No. PCT/EP2015/062113 filed Jun. 1, 2015, which designates the United States of America, and claims priority to DE Application No. 10 2014 211 550.7 filed Jun. 17, 2014, the contents of which are hereby incorporated by reference in their entirety.

TECHNICAL FIELD

The present disclosure relates to motor vehicles in general. The teachings thereof may be embodied in various systems and methods for heating and air conditioning motor vehicles.

BACKGROUND

An air-conditioning system in a motor vehicle typically cools the passenger compartment of the vehicle and also heats it. In motor vehicles driven by an internal combustion engine, the waste heat of the exhaust gas can be used to heat the passenger compartment of the motor vehicle. To cool the compartment, an air-conditioning compressor is mechanically driven by the internal combustion engine in order to generate cold air and uses part of the kinetic energy of the internal combustion engine for air-conditioning.

This means that a portion of the fuel consumed by internal combustion engines is used to operate the air-conditioning system. However, in the case of vehicles with low-power internal combustion engines and/or in the case of vehicles with a hybrid drive (e.g., internal combustion engine and electric motor) or else in the case of electric vehicles, the expenditure of energy for temperature control becomes more and more significant in light of the overall energy efficiency.

SUMMARY

The teachings of the present disclosure may be employed to improve the overall energy balance of a motor vehicle, e.g., by reducing the energy required for temperature control. For example, some embodiments may include a method for determining a parking indication for a motor vehicle, comprising: determining a future starting time period (20) in which a start of use (30) of the motor vehicle occurs; determining a direction of solar radiation for a future temperature-control time period (40, 40') which is followed by the starting time period (20), wherein the direction of solar radiation is determined relative to a current or future course of the roadway along which the motor vehicle is moving; and determining (50, 50') an outside temperature. In some embodiments, the method may include at least one of: determining an optimized parking position (Pos) for the motor vehicle, at which parking position (Pos) a passenger compartment of the motor vehicle receives a quantity of solar radiant heat which results from the direction of solar radiation and which is greater than a quantity of solar radiant heat of an alternative parking position thereto if the outside temperature is below a setpoint temperature, and/or determining an optimized parking position (Pos) for the motor vehicle, at which parking position (Pos) a passenger compartment of the motor vehicle receives a quantity of solar radiant heat which results from the direction of the solar radiation and which is smaller than a quantity of solar radiant heat of an alternative parking position thereto if the outside temperature is above a setpoint temperature.

In some embodiments, the future starting time period is determined by: acquiring travel patterns and by predicting a future travel pattern on the basis of the acquired travel patterns; or by acquiring the future starting time period (20) as a user input by means of a user input interface or a data interface in the motor vehicle or by means of a radio receiver module.

In some embodiments, the direction of the solar radiation is determined by: determining (60, 60') a current position of the vehicle or a position of the vehicle located in the course of the roadway, by means of a navigation device, and calculating the direction of the solar radiation on the basis of the position of the vehicle and the position of the sun which results from the local time at this position of the vehicle, for the temperature-control time period (40, 40'), wherein the determination of the position of the vehicle and the calculation of the direction of the solar radiation are carried out in a calculation device inside the vehicle or a central calculation device which has a communication connection to the vehicle.

In some embodiments, a side of the roadway and/or an orientation of the vehicle with respect to the course of the roadway are/is determined as the parking position, wherein the parking position is output by means of a display, by means of a voice output or by means of an acoustic or haptic signal generator.

In some embodiments, the optimized parking position (Pos) is that parking position of all the parking positions which are possible in the course of the roadway at which the passenger compartment receives the greatest quantity of solar radiant heat if the outside temperature is below a setpoint temperature, or the optimized parking position (Pos) is that parking position of all the parking positions which are possible in the course of the roadway at which the passenger compartment receives the smallest quantity of solar radiant heat when the outside temperature is above a setpoint temperature.

In some embodiments, the outside temperature is determined (50, 50') by detecting the temperature by means of a temperature sensor (150) or by receiving weather information which comprises the current temperature or a predicted temperature for a point in time within the temperature-control time period or starting period, wherein the outside temperature which is detected by means of a temperature sensor is the current outside temperature or refers to a point in time within the temperature-control time period or starting time period, wherein a current temperature is extrapolated to the point in time within the temperature-control time period or starting time period on the basis of the local time at the vehicle.

In some embodiments, a quantity of solar radiant heat is calculated for the temperature-control time period (40, 40') from the direction of the solar radiation, wherein, in addition: heights of buildings which are received from a geo-service or are read out from a geodatabase are taken into account in the determination of the quantity of solar radiant heat, and/or weather condition information or weather information which is received from a weather service (154) or which is generated inside the motor vehicle by means of a weather station (154') is taken into account in the determination of the quantity of solar radiant heat.

Some embodiments may include a parking indicator (100) for a motor vehicle, comprising: a user input interface (110) or data input interface (110) for inputting an expected future start of use of the motor vehicle or a travel pattern-detection module (120) with a memory (124) configured to store starts of use of the motor vehicle as a function of the time, day of the week or vehicle user, and configured to estimate a future start of use on the basis of the data stored in the memory (124); a radiation-detection device (130) configured to determine a direction of the solar radiation for a future temperature-control time period (40, 40') which is followed by the starting time period (20), a navigation device (140) configured to determine a section of road, wherein the radiation-detection device is configured to determine the direction of the solar radiation relative to a current or future course of the roadway along the section of road or in the vicinity of the section of road; a temperature sensor (150) configured to determine an outside temperature of the motor vehicle or a reception interface (152) for weather information which comprises an outside temperature; a parking position-determining device (160) which is connected to the navigation device (140), the radiation-detection device (130) and the temperature sensor (150) or the reception interface (152) and also to the user input interface (110) or data input interface (110), wherein the parking position-determining device (160) is configured to determine an optimized parking position for the motor vehicle, at which parking position a passenger compartment of the motor vehicle receives a quantity of solar radiant heat which results from the direction of the solar radiation and is greater than a quantity of solar radiant heat of an alternative parking position thereto when the outside temperature is below a setpoint temperature or is lower than a quantity of solar radiant heat of an alternative parking position thereto when the outside temperature is above a setpoint temperature, wherein the parking position-determining device has an output interface (170) which is configured to output a signal which represents the optimized parking position.

Some embodiments may include a display (180) which is connected to the output interface (170) and is configured to output the optimized parking position, wherein the parking indicator also has a parking aid device (200), wherein the specified display is also configured as a graphic output device of the parking aid device (200).

Some embodiments may include a voice output unit (190) configured to output the optimized parking position; an acoustic signal generator (192) which is configured to output an acoustic signal, wherein the signal generator is configured to output the acoustic signal as a function of an approach to the optimized parking position; or an electromechanical converter unit (194) configured to mechanically interact with a steering system of the vehicle, wherein the converter unit is configured to output a force signal to the steering system, which force signal is dependent on an approach to the optimized parking position.

DETAILED DESCRIPTION

Figure 1:
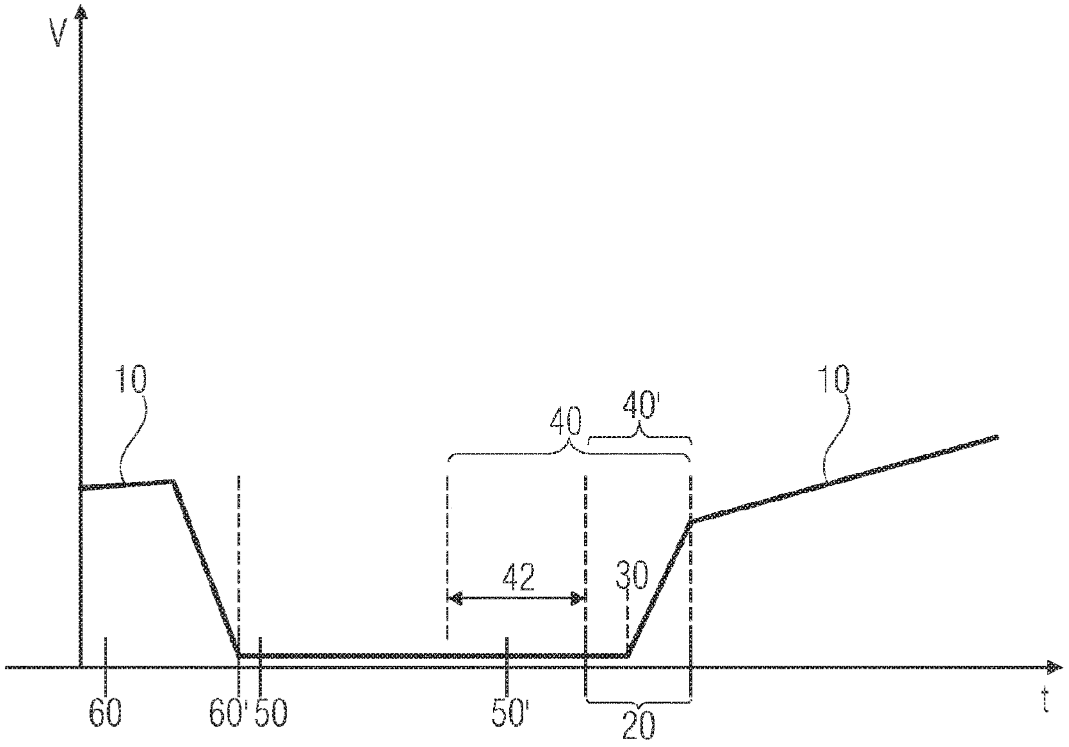
FIG. 1 shows in schematic form an exemplary speed profile of a motor vehicle incorporating teachings of the present disclosure.

The solar radiation, shading of, or the radiation of heat by the motor vehicle into the surroundings may be used selectively in order to have to use only a small or preferably no energy component for air-conditioning, particularly in a starting time period of the use of the motor vehicle. This technique may be used to provide an overall saving in fuel or electrical energy, which may additionally increase the range of the vehicle per unit energy. Also, it may provide the opportunity to equip the air-conditioning devices (heating and cooling systems) with a relatively low maximum power, since in the steady-state operating mode the temperature-control devices are usually operated with a lower power than at the start of the vehicle if the temperature is particularly low or particularly high.

In addition, at the beginning of the starting time period, there is already only a small difference between the actual temperature in the passenger compartment and a setpoint temperature, so that, for example, it is not necessary to wait until the internal combustion engine has reached a sufficient coolant temperature in order to heat the passenger compartment with heated air.

For this purpose, the motor vehicle may be selectively parked so that at the next start, that is to say in a future starting time period, the vehicle has already been sufficiently heated by solar radiation, or by selective parking in a shaded area the vehicle had the possibility of cooling (or of not being heated by direct solar radiation). Therefore, the influence of the sun or of shade, and of the ambient temperature, on the temperature of the passenger compartment of the motor vehicle may be used to adjust the passenger compartment of the motor vehicle to a specific temperature range or at least in the direction of a destination temperature in a temperature-control time period occurring before the starting time period. During the temperature-control time period occurring before the starting time period, the vehicle may be prepared by corresponding temperature control by means of solar radiation or by means of shading, with the result that in a future starting time period the actual temperature is at least in the vicinity of the setpoint temperature.

In order to use the solar radiation or the shading selectively during the temperature-control time period, an optimized parking position is determined before the vehicle is parked (and therefore also before the temperature-control time period), with the result that simply by indicating an optimized parking position the driver has the possibility of correspondingly setting the temperature of the vehicle in the temperature-control time period in order to avoid having to use particularly large quantities of energy in the starting time period which follows (indirectly or directly). In this context, the orientation of the vehicle and the relative position thereof with respect to the roadway is considered as the parking position (e.g., the road side, the direction relative to the course of the roadway, and/or the compass direction, etc.). On the basis of the recommended parking position it is possible for the driver to park the motor vehicle in an optimized location and/or orientation, with the result that the motor vehicle can assume the desired temperature in a temperature-control time period following the parking (indirectly or directly).

Some embodiments may include a method for determining a parking location indication for a motor vehicle. A future starting time period is determined in which a start of use of the motor vehicle occurs. The method may be carried out during a phase of the search for a parking space, e.g., just before a destination, and is aimed at a starting time period or temperature-control time period. After the parking of the motor vehicle, e.g., after the parking operation, a parking time period begins, which may include the temperature-control time period. The temperature-control time period may coincide with the parking time period or can take up a section of the parking time period which ends with the end of the parking time period. An anticipated subsequent start of the motor vehicle is considered to be a start of use, but merely unlocking or opening the motor vehicle without the driving mode can also be considered to be a start of use.

In addition, a direction of solar radiation is determined for the future temperature-control time period (or for an approximation thereof for the starting time period). The temperature-control time period precedes the starting time period, with the result that the temperature-control time period is followed by the starting time period. The direction of solar radiation is determined relative to a course of the roadway, e.g., a current or future course of the roadway, along which the motor vehicle is moving. In this context, the current or future course of the roadway relates to the distance which is traveled along (directly) before a specified destination is reached. The current course of the roadway is therefore the course of the roadway along which the motor vehicle moves during the search for a parking space or while traveling to the destination. The future course of the roadway corresponds to the distance which still has to be traveled to the destination.

In addition, an outside temperature may be determined to take into account not only the input of heat by the solar radiation but also the change in temperature as a result of shading and/or as a result of radiation of heat. The outside temperature may be determined in order to detect whether the passenger compartment of the motor vehicle is to receive as much or as little heat as possible from the outside during the temperature-control time period.

An optimized parking position for the motor vehicle may be defined as one at which a passenger compartment of the motor vehicle receives a maximum and/or minimum quantity of solar radiant heat. For example, the predicted quantity of solar radiant heat may be greater than a quantity of solar radiant heat of an alternative parking position thereto, if the outside temperature is below a setpoint temperature. The quantity of solar radiant heat which results from the direction of the solar radiation at the optimized parking position may be greater than the quantity of solar radiant heat of a multiplicity of the alternative parking positions. The quantity of solar radiant heat at the optimized parking position may be greater than the average or the median of all the quantities of solar radiant heat at random (possible) parking positions. The optimized parking position may not necessarily considered to be the absolute maximum or minimum of a quantity of solar radiant heat which results but instead a parking position at which a quantity of solar radiant heat results which is, on average, greater than in the case of a random selection of the parking position.

An optimized parking position complementary to that described above may be chosen if the outside temperature is above a setpoint temperature (and therefore the quantity of solar radiant heat has to be minimized, in contrast to the abovementioned, whether relative or absolute maximization). If the outside temperature is above a setpoint temperature, an optimized parking position for the motor vehicle may be that at which the passenger compartment of the motor vehicle receives a quantity of solar radiant heat. This quantity of heat received would be smaller than a quantity of solar radiant heat of an alternative parking position thereto.

The quantity of solar radiant heat at the optimized parking position is smaller than a multiplicity of possible alternative parking positions and in particular smaller than a quantity of solar radiant heat which represents the average (or the median) of quantities of heat which would result given a random selection of the parking position. As a result, absolute optimization is not required here either, but instead relative optimization with respect to a multiplicity of relatively poor parking positions is sufficient.

Possible parking positions are considered to be positions which are within a range starting from a predefined destination. The parking positions may be selected from a set of possible free parking places and/or orientations which do not infringe traffic regulations. A motor vehicle may be a vehicle with a pure electric drive, an internal combustion engine, or a hybrid vehicle. An internal combustion engine can be used as a second drive component of the hybrid vehicle.

The determination of the future starting time period can be implemented by means of a learning process in which traffic patterns are acquired and traffic patterns which have already been acquired are evaluated, or in which the starting time period is predefined. Travel patterns may be acquired and a future travel pattern may be predicted on the basis of the acquired (previous) travel patterns. A travel pattern indicates here the time periods in which the motor vehicle is parked, or not locked or travels or which it is in a travel mode (e.g., active). A travel pattern results from the use of the motor vehicle over time, wherein determined, repeating patterns can be acquired and predictions can be generated therefrom.

For example, if it is detected that the vehicle is always operational on working days between 8 and 9 am, for a time period of 20 to 40 minutes, and is subsequently parked until at least 5 or 6 pm, before being operational again for 20 to 40 minutes, that pattern may be used in the methods described herein. Such a pattern may result in other repeating applications.

In some embodiments, the future starting time period can be acquired as a user input, by means of a user input interface. This user input interface can be a keyboard, touch-sensitive screen, a keypad, a computer mouse, or the like. The user input interface can be located in the vehicle. The user interface can be installed in the vehicle or can be the user interface of a portable electronic device (e.g., mobile radio device, laptop, etc.) which can be in turn connected to the motor vehicle in a data-transmitting fashion.

Alternatively, a user input can be transferred to the motor vehicle from the outside, for example via a data interface which can be cable-bound or can be based on a close-range radio link, for example in the form of a Bluetooth data interface. Alternatively, the user input interface can be provided as a radio reception module in the motor vehicle which is mobile radio enabled. As a result, the user can input the future starting time period on a device outside the vehicle, wherein the device (computer, mobile radio device, laptop, etc.) is also mobile radio enabled and transmits the corresponding data, representing the starting time period to the radio reception module of the motor vehicle.

The user input interface can be controllable by the user if said interface is located within the vehicle and is directly suitable for inputs by the user, or can be an interface for electrical signals, for example the data interface or the radio reception module via which a device can communicate with the motor vehicle, wherein the device itself is directly suitable for inputs by the user. The device used here can be, for example, a mobile radio device via which calendar inputs can firstly be input (if appropriate also by means of a further computer) and which is capable of transferring the starting time period in the form of radio signals or current signals or voltage signals to the vehicle.

The direction of the solar radiation may be determined by determining a current position of the vehicle or a position of the vehicle located in the course of the roadway, for example by means of a navigation device. This navigation device may comprise an orientation device or may be implemented as an orientation device. The section of road leading to a predefined destination may be a course of a roadway, or a set of possible sections of road which lead to the destination (and lie around the destination within a predefined circle). The predefined destination may be used within the navigation device to determine and propose a route. As a result, the navigation device can be used to detect a destination region in which the destination lies, in order to propose a parking position (e.g., a parking place and/or an orientation) at the destination region, on a possible route to the target region, or at the current position of the motor vehicle.

The orientation of the vehicle may be considered to be the position of the vehicle. In addition, the direction of the solar radiation may be calculated on the basis of this position. Alternatively or in combination herewith, the direction of the solar radiation can be determined on the basis of the local time at the position. The direction of the solar radiation may be calculated on the basis of the position of the sun, which also results from the local time at this position.

The direction of the solar radiation may be calculated for the temperature-control time period. The direction of the solar radiation can therefore be a specific direction or an angular interval or a spatial angular interval. The position of the sun which represents the compass direction or the altitude (the altitude angle) of the sun is apparent in a known fashion from the relative position between the earth and the sun in relation to the respective local time and can therefore be determined, for example, on the basis of sun position diagrams.

In some embodiments, the direction of the solar radiation and, if appropriate, also the position in a device inside the vehicle are calculated, for example in a calculation device, which is located inside the vehicle. This calculation device may calculate the position of the sun. In some embodiments, a central calculation device determines the direction of the solar radiation and/or the position. The position can be specified using position data output by the vehicle to the calculation device. The position may comprise a location of the vehicle and/or the orientation of the vehicle with respect to a compass direction or with respect to the course of the roadway on which the vehicle is located.

The recommended parking position, therefore, may indicate a side of the roadway and/or an orientation of the vehicle with respect to the course of the roadway. The parking position may include the side on which the motor vehicle is to be parked, or the angle at which it should be located with respect to the course of the roadway, perpendicularly or transversely with respect to the course of the roadway (unless other orientations are possible).

The parking position can be output as a data signal which is machine-readable or which can be perceived by the user. In this context, the parking position (which can be perceived by the user) may be displayed with a display indicating the orientation or the side of the roadway and/or with the course of the roadway on which the motor vehicle is located. Alternatively, the parking position can be output by means of a voice output or by means of some other acoustic signal. In addition, the parking position can be output by means of a haptic signal generator which is connected in a force-transmitting fashion, to a steering system of the vehicle. Such signal generators can implement vibration or a variable force here, for example to propose a steering direction to the user. In the case of automated parking devices, the parking position can be used (in a machine-readable fashion) directly as an input signal, as a result of which the motor vehicle is able to automatically assume the proposed optimized parking position.

The optimal parking position is that parking position of all the potential parking positions at which the passenger compartment receives the greatest solar radiant heat when the ambient temperature is lower than the setpoint. This relates to the quantity of all the parking positions which are possible along the roadway. All the possible parking positions are those which are permitted on the basis of the road traffic regulation or a comparable regulation. The position may include the orientation of the vehicle with respect to the course of the roadway as well as the location on the roadway, wherein the road traffic regulation or a comparable regulation provides parking places or stopping places and does not permit other orientations or stopping places or parking places. In particular, all the possible parking positions are those located within a predetermined range starting from a predefined destination of the motor vehicle. The range can be a (predefined) distance or else be represented in the form of a (predefined) travel duration.

In a complementary case with respect to the above, if the outside temperature is above a setpoint temperature, that parking position which receives the smallest quantity of solar radiant heat is the optimal parking position. The optimized parking position may be that parking position of all the parking positions possible along the roadway at which the passenger compartment receives the smallest quantity of solar radiant heat when the outside temperature is above a setpoint temperature.

The outside temperature can be determined by detecting the temperature with a temperature sensor located on the motor vehicle. In this context, it is possible to have recourse to a temperature sensor which performs other functions within the motor vehicle. The temperature can be an instantaneously detected temperature or can be a predicted temperature, e.g., a temperature predicted for the starting time period and/or for the temperature-control time period.

In addition, the temperature can be detected by receiving weather information comprising the current temperature or a predicted temperature for a time period within the temperature-control time or starting time. The temperature may relate to a region in which the motor vehicle is currently located and/or in which the destination of the motor vehicle is located. Furthermore, the outside temperature detected by means of a temperature sensor may be the current outside temperature or may refer to a point in time within the temperature-control time period or starting time period. A temperature for the temperature-control time period can be predicted on the basis of a current temperature (on the basis of the temperature detected at the temperature sensor or on the basis of the temperature of the weather information). The temperature is extrapolated to the temperature-control time period or starting time period, in particular to a point in time within the temperature-control time period or starting time period.

In some embodiments, shading effects by objects on the course of the roadway are also taken into account, at the destination or at the optimized parking position. It is possible to calculate a quantity of solar radiation for the temperature-control time period from the direction of the solar radiation. In addition, objects such as plants, in particular trees, can be taken into account in the calculation of the quantity of solar radiant heat. Such objects are determined, for example, by means of data indicating the degree to which the area is built up from a geodatabase, wherein the data relating to the degree to which an area is built up can indicate, for example, whether a green area is provided on the course of the respective roadway or at the corresponding destination, or whether a built-up area is provided there, wherein, in particular, the degree to which the area is built up can be determined from the geodatabase.

In particular, during the determination of the quantity of solar radiant heat it is possible to take into account the heights of buildings which are received from a geoservice or read out from a geodatabase. The degree to which an area is built up, as mentioned above, or the green area can also be received from the geoservice. In some embodiments, the weather-conditioned solar radiation is accounted during the determination of the quantity of solar radiant heat. In this context, weather condition information or weather information is included in the determination of the quantity of solar radiant heat. This information may be received from a weather service. Alternatively, this information can be generated by means of a weather station inside the motor vehicle. Such a weather station is already known from mobile applications, for example in the private domain, and can comprise, in addition to a temperature sensor, an air pressure sensor and/or a moisture sensor, by means of which the weather can be predicted for the next few hours or for several days, wherein the temperature profile, the air pressure profile and/or the moisture profile are used to make a prediction about the weather.

The quantity of solar radiant heat and/or the optimized parking position may be provided by a central computing unit which has a radio link to the motor vehicle. In addition to the mobile radio links already mentioned, car-to-car or car-to-X communication protocols can also be used for transferring data to the motor vehicle (and/or in the opposite direction).

In some embodiments, a parking indicator for a motor vehicle may comprise a user input interface or data input interface. The latter is configured to input an expected, future start of use of the motor vehicle. As an alternative to, or in combination with this interface, a travel pattern-detection module may have a memory storing data about the start of use of the motor vehicle as a function of the time, day of the week, or as a function of the vehicle user. As an alternative to, or in combination therewith, a memory may store data about the end of use of the motor vehicle.

Activation times or deactivation times at which the motor vehicle is opened, activated or moved or at which the vehicle is parked or locked may be used as the start of use or end of use. The travel pattern-detection module may store data about the start of use or about the end of use of the motor vehicle in the memory and also retrieve it. The travel pattern-detection module may estimate a future start of use on the basis of the data stored in the memory. For example, the profile of the starts of use may be detected and extrapolated over several days by averaging or by extrapolation taking into account a trend.

In some embodiments, the parking indicator also comprises a radiation-detection device. This device may determine a direction of the solar radiation for a future temperature-control time period, wherein the temperature-control time period is followed by the starting time period. The temperature-control time period corresponds to the temperature-control time period already mentioned. This applies also to the starting time period. The temperature-control time period can extend over the entire parking time period of the motor vehicle or can extend over only a section of the parking time period which is followed by the starting time period (directly or indirectly).

The parking indicator may comprise a navigation device. This navigation device may determine a section of road and/or register a destination. The navigation device can comprise a location-determining device.

The radiation-detection device may determine the direction of the solar radiation relative to a current or future course of the roadway along the section of road (predefined by the navigation device) or in the vicinity of the section of road at the destination or in a destination region in which the destination lies. The region can be defined by a maximum distance starting from the destination. Instead of a geometric distance it is also possible to use a time distance in the sense of a travel duration.

The parking indicator may comprise a temperature sensor to determine an outside temperature of the motor vehicle. Instead of, or in combination with, the temperature sensor, a reception interface can be provided for weather information which comprises an outside temperature. The reception interface may be a radio interface configured to communicate with a weather service.

The parking indictor may comprise a parking position-determining device connected to the navigation device and/or to the radiation-detection device. In addition, the parking position-determining device can be connected to the temperature sensor and/or to the reception interface. In addition, the parking position-determining device can be connected to the user input interface or data input interface. In particular, the parking position-determining device may be connected downstream of these components in order to receive data from them.

The parking position-determining device may be configured to determine an optimized parking position for the motor vehicle, at which a passenger compartment of the motor vehicle receives a quantity of solar radiant heat which results from the direction of the solar radiant. This quantity is greater than a quantity of solar radiant heat of an alternative parking position thereto (at the same position (near the destination)) when the outside temperature is below a setpoint temperature. As an alternative or in combination therewith, the quantity of solar radiant heat at the optimized parking position is lower than a quantity of solar radiant heat of an alternative parking position thereto (for example on the opposite side of the road of the optimized parking position) when the outside temperature is above a setpoint temperature. Instead of a comparison with an alternative parking position, it is also possible, as stated above, to compare the optimized parking position with a multiplicity of alternative parking positions, or with all of the alternative parking positions, as described above within the scope of the explanation of the method.

Finally, the parking indicator may comprise an output interface to output a signal which represents the optimized parking position. This output interface may include be an interface for data and therefore can output electronic signals, or can be configured to present user data (visually, graphically, acoustically or haptically). The output interface may be an output interface for machine-readable signals or for signals which are suitable for presentation to a user.

In some embodiments, the parking indicator may comprise a display connected to the output interface. The display is configured, e.g., together with the output interface, to put out the optimized parking position. The parking indicator may have a parking aid device. The abovementioned display may be configured as a graphic output device of the parking aid device. In some embodiments, the same display is connected downstream both of the parking aid device and of the output interface, to represent alternately or at the same time the optimized parking position and a graphic display for assisting the parking.

In some embodiments, the parking indicator can comprise a voice output unit configured to output the optimized parking position. The parking indicator can also have an acoustic signal generator configured to put out an acoustic signal (for example a signal tone with a variable duration or tone pitch). The signal generator may put out the acoustic signal as a function of an approach to the optimized parking position. In this context, the duration of the acoustic signal and/or the tone pitch may be changed as the distance from the optimized parking position changes. The user can receive, on the basis of the tone pitch or on the basis of the duration, an indication which leads to the optimized parking position.

In some embodiments, the parking indicator comprises an electromechanical converter unit. The unit may mechanically interact with a steering system of the vehicle. The steering system of the vehicle may not be part of the parking indicator here. In some embodiments, the converter unit includes a mechanical interface configured for connection to the steering system. The converter unit may put out a force signal corresponding to a longitudinal force or a force which gives rise to a torque to the steering system. The force signal is dependent on an approach to the optimized parking position. As described above, the converter unit can be here, as a mechanical signal, a vibration or a continuous variable force.

The teachings described here use the solar radiation acting on the vehicle in the parking time periods to account for its strong effect on the energy consumption in the following travel phase, in particular since the subsequent travel phase must start, under certain circumstances, with strong cooling or heating of the vehicle in order to arrive at a setpoint temperature range. Correspondingly, the solar radiation active on the vehicle may be optimized by optimizing the parking position, in conjunction with the planned end of the parking, that is to say in conjunction with the (future) starting time period.

The methods and the system described herein may advise the driver, through an optimum selection of the parking position, e.g., location and orientation, to adjust the passenger compartment of the vehicle as far as possible to an optimum temperature range by the solar radiation or by eliminating the solar radiation by shading. This optimum temperature range relates to the starting time period. E.g., in summer as far as possible in the last hour before the vehicle drives off, it should be in shadow. As a result, it can cool, in particular, by radiating heat. In winter, the complementary procedure uses the solar radiation to the benefit of the vehicle in the last parking hour, with the result that a possible icing up of the windscreen is avoided and the passenger compartment of the motor vehicle is heated as far as possible by the sun.

In the summer, when the outside temperature is above a setpoint temperature, the quantity of solar radiant heat is therefore minimized by optimized parking positioning, while in winter, that is to say generally when the outside temperature is below a setpoint temperature, the quantity of solar radiant heat is provided to be as large as possible by orienting the parking positioning correspondingly. In some embodiments, a navigation device implements the method or is connected to a parking indicator which implements the method, wherein the parking indicator itself can also implement the specified procedure. A planned end of parking time can be specified directly by the user via a corresponding input interface (touch-sensitive screen, keyboard, keypad or the like), or a mobile radio device of the driver (or else a computer) can comprise a calendar function from which the end of the parking time can be derived. In this context, the end of the parking time corresponds to the starting time period, and can also have in a boundary case a duration of essentially 0 and can therefore be represented as a point in time. On the basis of stored geometric data, which represent, in particular, the destination, and on the basis of the calculated direction of the solar radiation, an optimized parking position is determined and communicated to the user (for example via a graphic display).

Instead of calculation in situ at the vehicle or in a mobile radio device which is connected to the vehicle (or a stationary computer which is connected to the vehicle), the procedure which is described here can also be provided as a central service line, wherein a central computing unit for the motor vehicle or else for a region calculates the optimized parking position and transfers it by means of a radio protocol to the motor vehicle or to a mobile radio device which is connected to the motor vehicle in a data-transmitting fashion. In this context, the central computing unit can be configured to calculate an optimized parking position, and to transfer said parking position as an electronic message to the navigation device or to a mobile radio device of the user.

FIG. 1 shows a speed profile of a motor vehicle, corresponding to a travel pattern on the basis of a speed curve 10 as a function of the time t. The speed v is high at the start of the illustrated profile (on the v axis), since a destination is being driven to, and it then reduces until up to the stationary state when the destination is reached. The vehicle firstly remains in the stationary state in order then to be activated again in a starting time period, wherein at a start of use 30 the vehicle is activated again and drives off again. When the vehicle is parked, a parking time period which extends up to the start of use 30 starts, wherein during the parking time period a temperature-control time period 40 or alternatively 40' is provided by controlling the temperature of the motor vehicle selectively by means of solar radiation or selectively by means of shading.

It is illustrated by way of example that the temperature-control time period 40 can correspond essentially to the parking time period and therefore starts with the parking of the vehicle, while in the case of an alternative temperature-control time period only a last section 40' of the parking time period is used as a temperature-control time period. It is illustrated that the temperature-control time period ends with the start of the starting time period 20, but the temperature-control time period can also end with the actual start of use 30. The starting time period is illustrated as a time interval, since a precise start of use 30 frequently cannot be estimated specifically, but the starting time period can contract to become a point in time which corresponds to the start of use 30 if a precise start of use is predefined, for example, by the user. The time duration 42 of the temperature-control time period 40', for example an hour or the like, can also be predefined, wherein the temperature-control time period 40' extends before the starting time period 20 by this time duration 42.

Alternatively, this duration can also extend before the specific start of use 30. A determining step 50, 50' takes place, as illustrated in the profile diagram, either just after the parking of the vehicle, during the parking of the vehicle or else for a point in time during the temperature-control time period, wherein the duration can also be provided in advance, see use number 50' and can relate, in particular, also to the start of use or to the starting time period.

A determining step 60, 60' for a position of the motor vehicle is also provided, which determining step 60, 60' can take place, for example, at the point in time (see reference numbers 60, 60') illustrated in FIG. 1. In this context, the position is determined to detect the direction of solar radiation and therefore the conditions of the incidence of light at the vehicle position, preferably at the end of the journey and therefore just before the parking, in order to determine the direction of solar radiation for the specific expected parking area. On the basis of the direction of solar radiation, it is then possible to determine the optimized parking position (Pos) which gives rise to the desired high and low quantity of solar radiant heat.

Figure 2:
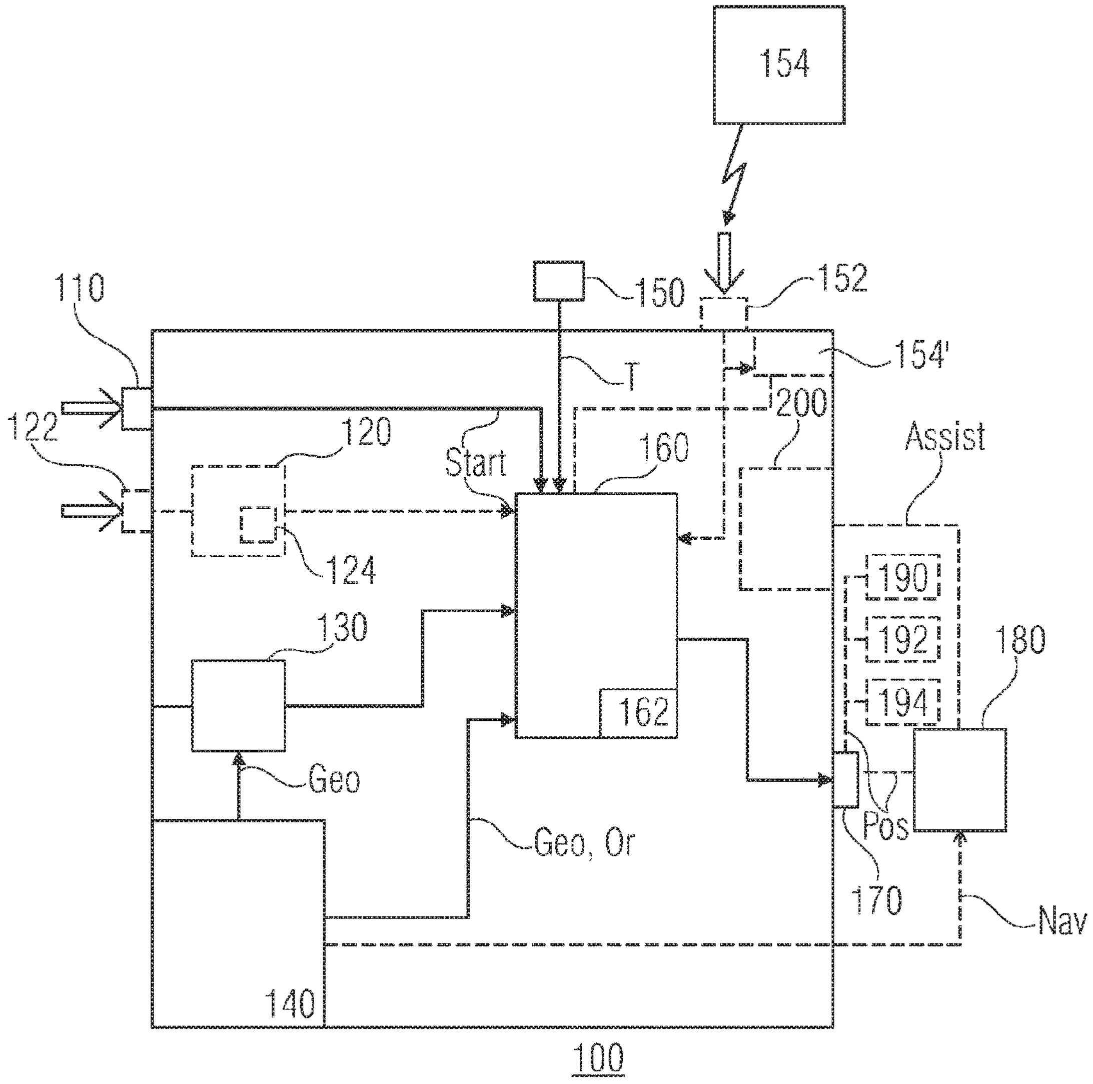
FIG. 2 shows an embodiment of a parking indicator incorporating teachings of the present disclosure.

FIG. 2 shows an example of a parking indicator 100 with a user input interface 110 or data input interface 110 at which, as illustrated with the double arrow, data can be input by the user or on the basis of electrical signals or radio signals. For example, a smartphone or some other radio device can also be connected to this interface in a data-transmitting fashion, e.g., without a cable or in a cable-bound fashion.

Some embodiments may include a travel pattern-detection module 120 which receives activation information of the motor vehicle via an interface 122. This activation information can be represented by an activation signal of the drive or by an activation signal of the on-board power system of the motor vehicle. Some embodiments may include a memory 124 in the travel pattern-detection module 120, in which memory 124 the time periods or points in time at which the vehicle is deactivated, is not active, is activated, or deactivated can be stored. A timer or a time signal receiver which can detect the time and/or day of the week, to store activation information together with a time entry, may be in the travel pattern-detection module.

A radiation-detection device 130 may determine the direction of the solar radiation on the basis of a location signal Geo, which may be fed in via a navigation device 140.

Some embodiments may include a temperature sensor 150 for determining the outside temperature. Alternatively, an interface 152 may transfer from a weather service 154 to the parking indicator data which comprises the outside temperature for the region in which the motor vehicle is located. A weather station 154' may comprise a temperature sensor and outputs corresponding temperature data as an outside temperature.

A parking position-determining device 160 may receive, from the interface 110 and/or from the travel pattern-detection module 120, a signal start which represents the starting time period 20 or else the start of use 30. The parking position-determining device 160 may be connected to the temperature sensor 150 or to the equivalents 152 or 154 thereof, to acquire therefrom a temperature signal T which represents the outside temperature.

In addition, the parking position-determining device 160 may be connected to a navigation device 140 to receive therefrom data about the location of the motor vehicle and/or about the orientation of the motor vehicle. A signal Geo represents the location, while a signal Or indicates the orientation of the motor vehicle in the sense of a compass direction. This data may be transferred to the parking position-determining device 160, wherein the parking position-determining device 160 is also connected to the radiation-detection device 130, in order to acquire therefrom a signal which represents the direction of radiation of the sun (e.g., the conditions of the incidence of light).

On the basis of this data, the parking position-determining device 160 can, as described above, calculate an optimized parking position and transfer it to an output interface 170. A setpoint temperature 162 may be stored in the parking position-determining device 160. Alternatively, the reference number 162 can also represent an input interface at which the parking position-determining device 160 can acquire a setpoint temperature, in the form of an air-conditioning module of the motor vehicle.

A display 180 of the parking indicator 100 may be connected downstream of the output interface 170 and indicate the optimized parking position. The optimized parking position is represented in the form of a signal Pos which is output to the interface 170 by the parking position-determining device 160 and passed on by this output interface 170.

As an alternative to, or in combination with, the display 180, a voice output unit 190, an acoustic signal generator 192, or an electromechanical converter 194 may receive the signal Pos from the output interface 170. In some embodiments, the display 180 represents a graphic parking assistance signal Assist which is output by a parking aid device 200. The signals Assist and Pos can be displayed, in a graphically combined form, on the display 180.

FIG. 2 shows a parking indicator with an integrated navigation device 140 and an integrated parking aid device 200, but these components can also be located outside the parking indicator and can communicate with the parking indicator via an interface of said parking indicator. Furthermore, the parking position-determining device 160 can be provided outside the vehicle and can be connected thereto over distance, with the result that the vehicle itself merely has essentially the display 180 to display the signal Pos.

FIG. 2 shows a highly integrated solution. Some embodiments, however, comprise a highly decentralized solution, wherein the parking indicator may be located outside the motor vehicle, a navigation device is provided outside the parking indicator, and although the parking aid device 200 is also located inside the motor vehicle, it can also be provided outside the parking indicator. The components 140 and 200 are therefore not necessarily part of the parking indicator. This also applies to the weather station 154' and to the display 180. The radiation-detection device 130 can also be provided in a decentralized fashion and not specifically indicate the direction of the solar radiation for a motor vehicle but rather generally for a geographic region.

LIST OF REFERENCE NUMBERS

10 Time profile of the motor vehicle speed
20 Starting time period
30 Start of use
40,40' Temperature-control time period
50,50' Determining an outside temperature or point in time at which this determination is carried out
60,60' Determining a position of the motor vehicle or points in time at which the position is determined
42 Duration of the temperature-control time period
40' Starting from the start of the starting time period 20 (or the start of use 30)
100 Parking indicator
110 User input interface or data input interface
120 Travel pattern-detection module
122 Input interface for acquiring an activation signal of the motor vehicle
124 Memory within the travel pattern-detection module
130 Radiation-detection device
140 Navigation device
150 Temperature sensor

152 Reception interface for weather information
154 Weather service
154' Weather station (tied to motor vehicle)
160 Parking position-determining device
162 Setpoint temperature or memory in which the setpoint temperature is stored, or input interface for setpoint temperature
170 Output interface
180 Display
190 Voice output unit
192 Acoustic signal generator
194 Electromechanical converter unit and
200 Parking aid device

What is claimed is:

1. A method for indicating an optimized parking position for a motor vehicle having a parking position-determining device, the method comprising:

determining, by the parking position-determining device, a starting time period for a future start of use of the motor vehicle;

determining, by the parking position-determining device, a direction of solar radiation for a temperature-control time period preceding the starting time period, the direction of solar radiation determined relative to a current or future course of a roadway along which the motor vehicle moves;

determining, by the parking position-determining device, an outside temperature related to a region in which the motor vehicle is currently located and/or in which a destination of the motor vehicle is located;

determining, by the parking position-determining device, the optimized parking position for the motor vehicle, the optimized parking position comprising:

(a) a first parking position of the motor vehicle in which a quantity of solar radiant heat received at a passenger compartment of the motor vehicle is less than a quantity of solar radiant heat received at the passenger compartment in an alternative parking position if the outside temperature is above a setpoint temperature, or (b) a second parking position of the motor vehicle in which a quantity of solar radiant heat received at the passenger compartment is greater than a quantity of solar radiant heat received at the passenger compartment in the alternative parking position if the outside temperature is below a setpoint temperature; and displaying the optimized parking position.

2. The method as claimed in claim 1, wherein said determining the starting time period comprises:

acquiring travel patterns and predicting a future travel pattern on the basis of the acquired travel patterns; or acquiring the future starting time period as a data input.

3. The method as claimed in claim 1, wherein said determining the direction of the solar radiation comprises:

determining a current position of the motor vehicle or a position of the motor vehicle located in the current or future course of the roadway along which the motor vehicle moves, using a navigation device of the motor vehicle, and calculating the direction of the solar radiation on the basis of the position of the motor vehicle and the position of the sun which results from the local time at this position of the motor vehicle, for the temperature-control time period, wherein the determination of the position of the vehicle and the calculation of the direction of the solar radiation are carried out in a calculation device.

4. The method as claimed in claim 1, wherein the optimized parking position includes a side of the roadway and/or an orientation of the vehicle with respect to the current or future course of the roadway.

5. The method as claimed in claim 1, wherein said detecting the outside temperature comprises:

detecting the temperature using a temperature sensory; or receiving weather information comprising the current temperature or a predicted temperature for a point in time within the temperature-control time period or starting period;

wherein the outside temperature detected with a temperature sensor is the current outside temperature or a point in time within the temperature-control time period or starting time period, wherein a current temperature is extrapolated to the point in time within the temperature-control time period or starting time period on the basis of the local time at the vehicle.

6. The method as claimed in claim 1, further comprising calculating, by the parking position-determining device, a quantity of solar radiant heat for the temperature-control time period, and wherein:

heights of buildings received from a geoservice or read out from a geodatabase are taken into account in the determination of the quantity of solar radiant heat, or weather condition information or weather information received from a weather service or generated inside the motor vehicle using a weather station is taken into account in the determination of the quantity of solar radiant heat.

7. The method as claimed in claim 1, wherein the displaying the optimized parking position includes a visual display, a voice output, an acoustic signal, or a haptic signal.

8. A parking position indicator for a motor vehicle, the parking position indicator comprising:

an input interface configured to indicate a starting time period for an expected future start of use of the motor vehicle;

a radiation-detection device configured to determine a direction of solar radiation for a future temperature-control time period preceding the starting time period;

a navigation device to determine a section of a roadway;

wherein the radiation-detection device determines the direction of the solar radiation relative to a current or future course of the roadway along the section of the roadway or in the vicinity of the section of the roadway;

a temperature input configured to detect an outside temperature of the motor vehicle;

a parking position-determining device connected to the navigation device, the radiation-detection device, the temperature input, the user input interface, the parking position-determining device configured to determine an optimized parking position for the motor vehicle, the optimized parking position defined as a parking position and/or orientation at which a passenger compartment of the motor vehicle receives a quantity of solar radiant heat greater than a quantity of solar radiant heat received at the passenger compartment in an alternative parking position of the motor vehicle when the outside temperature is below a setpoint temperature or lower than a quantity of solar radiant heat received at the passenger compartment in the alternative parking position when the outside temperature is above a setpoint temperature; and an output interface configured to output a signal representing the optimized parking position.

9. The parking position indicator as claimed in claim 8, comprising:

a display connected to the output interface and configured to output the optimized parking position, and a parking aid device, wherein the display includes a graphic output device of the parking aid device.

10. The parking indicator as claimed in claim 8, further comprising:

a voice output unit configured to output a voice output representing the optimized parking position;

an acoustic signal generator configured to output an acoustic signal as a function of an approach to the optimized parking position; or an electromechanical converter unit configured to mechanically interact with a steering system of the motor vehicle and output a force signal to the steering system, the force signal is dependent on an approach to the optimized parking position.

11. The parking position indicator as claimed in claim 8, further comprising a travel pattern-detection module with a memory to store starts of use of the motor vehicle as a function of the time, day of the week or vehicle user, and configured to estimate a future start of use on the basis of the data stored in the memory.

12. A method for indicating an optimized parking location for a motor vehicle having a parking position-determining device, the method comprising:

determining, by the parking position-determining device, a future starting time period for a start of use of the motor vehicle;

determining, by the parking position-determining device, a direction of solar radiation for a future temperature-control time period preceding the future starting time period, the direction of solar radiation determined relative to a current or future course of a roadway along which the motor vehicle moves;

determining, by the parking position-determining device, an outside temperature related to a region in which the motor vehicle is currently located and/or in which the destination of the motor vehicle is located; and determining, by the parking position-determining device, the optimized parking position (Pos) for the motor vehicle, the optimized parking position (Pos) comprising a parking position of the motor vehicle in which:

(a) a passenger compartment of the motor vehicle receives a quantity of solar radiant heat which results from the direction of solar radiation and which is greater than a quantity of solar radiant heat of an alternative parking position if the outside temperature is below a setpoint temperature or (b) the passenger compartment of the motor vehicle receives a quantity of solar radiant heat smaller than the quantity of solar radiant heat received at the passenger compartment in the alternative parking position if the outside temperature is above a setpoint temperature; and displaying the optimized parking position.

* * * * *